United States Patent
Fertig et al.

(10) Patent No.: US 10,330,697 B2
(45) Date of Patent: Jun. 25, 2019

(54) ACTIVE, IN-SITU, CALIBRATION OF MEMS ACCELEROMETERS USING OPTICAL FORCES

(71) Applicant: Honeywell International Inc., Morristown, NJ (US)

(72) Inventors: Chad Fertig, Bloomington, MN (US); Steven Tin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 899 days.

(21) Appl. No.: 14/847,880

(22) Filed: Sep. 8, 2015

(65) Prior Publication Data

US 2016/0334440 A1    Nov. 17, 2016

Related U.S. Application Data

(60) Provisional application No. 62/162,503, filed on May 15, 2015.

(51) Int. Cl.
*G01P 21/00* (2006.01)
(52) U.S. Cl.
CPC .................................. *G01P 21/00* (2013.01)
(58) Field of Classification Search
CPC ....................................................... G01P 21/00
See application file for complete search history.

(56) References Cited

U.S. PATENT DOCUMENTS 3,275,835 A    9/1966  Morrison
4,429,573 A    2/1984  Walker
5,559,358 A    9/1996  Burns et al.
(Continued)

FOREIGN PATENT DOCUMENTS

CN    101458152 B    12/2010
EP    2128565 A1    12/2009
(Continued)

OTHER PUBLICATIONS

Davies et al., "Remote Photothermal Actuation for Calibration of In-Phase and Quadrature Readout in a Mechanically Amplified Fabry—Perot Accelerometer," IEEE Photonics Journal, vol. 6, No. 3, Jun. 6, 2014, 16 pp.
(Continued)

*Primary Examiner* — Son T Le
*Assistant Examiner* — Alex T Devito
(74) *Attorney, Agent, or Firm* — Shumaker & Sieffert, P.A.

(57) ABSTRACT

An accelerometer device configured for in-situ calibration applies a laser-induced pushing force at a first magnitude to a proof mass of an accelerometer, and while applying the laser-induced pushing force at the first magnitude to the proof mass, the device obtains a first output from the accelerometer. The device is further configured to apply a laser-induced pushing force at a second magnitude to the proof mass, and while applying the laser-induced pushing force at the second magnitude to the proof mass, the device obtains a second output from the accelerometer. Based on the first output and the second output, the device determines a scale factor for the accelerometer. The device is configured to determine a third output for the accelerometer, and based on the scale factor and the third output, determine an acceleration value.

20 Claims, 6 Drawing Sheets

(56) References Cited

U.S. PATENT DOCUMENTS

| | | | |
|---|---|---|---|
| 5,969,249 | A | 10/1999 | Roessig et al. |
| 6,350,983 | B1 | 2/2002 | Kaldor et al. |
| 6,668,111 | B2 | 12/2003 | Tapalian et al. |
| 6,776,042 | B2 | 8/2004 | Pike et al. |
| 6,978,673 | B2 | 12/2005 | Johnson et al. |
| 7,444,868 | B2 | 11/2008 | Johnson |
| 7,605,391 | B2 | 10/2009 | Burns |
| 7,881,565 | B2 | 2/2011 | Kilic et al. |
| 7,980,115 | B2 | 7/2011 | Stewart et al. |
| 8,205,497 | B1 | 6/2012 | Okandan et al. |
| 8,334,984 | B2 | 12/2012 | Perez et al. |
| 8,616,055 | B2 | 12/2013 | Geen |
| 8,640,542 | B2 | 2/2014 | Zhang et al. |
| 8,726,732 | B2 | 5/2014 | Littler et al. |
| 8,783,106 | B1 | 7/2014 | Nielson et al. |
| 8,849,075 | B2 | 9/2014 | Painter et al. |
| 8,860,933 | B2 | 10/2014 | Compton et al. |
| 8,873,029 | B2 | 10/2014 | Wilfinger et al. |
| 8,904,867 | B2 | 12/2014 | Martin et al. |
| 9,030,655 | B2 | 5/2015 | Strabley |
| 9,069,004 | B2 | 6/2015 | Bhave et al. |
| 2006/0227845 | A1* | 10/2006 | Degertekin ............ G01D 5/285 372/102 |
| 2009/0241634 | A1* | 10/2009 | Acar ..................... G01P 21/00 73/1.79 |
| 2009/0281756 | A1* | 11/2009 | Weed ..................... G01P 21/00 702/104 |
| 2010/0063763 | A1 | 3/2010 | Rozelle |
| 2012/0103099 | A1 | 5/2012 | Stuke et al. |
| 2012/0265481 | A1 | 10/2012 | Stewart et al. |
| 2014/0016118 | A1 | 1/2014 | Compton et al. |
| 2014/0022534 | A1 | 1/2014 | Strabley |
| 2014/0043614 | A1 | 2/2014 | Dhayalan et al. |
| 2014/0096587 | A1 | 4/2014 | Stewart et al. |
| 2014/0208823 | A1 | 7/2014 | Trusov et al. |
| 2014/0230520 | A1 | 8/2014 | Bulatowicz |
| 2015/0020590 | A1 | 1/2015 | Painter et al. |

FOREIGN PATENT DOCUMENTS

| | | |
|---|---|---|
| EP | 2717060 A1 | 4/2014 |
| EP | 2770331 A1 | 8/2014 |
| WO | 2004012201 A2 | 2/2004 |
| WO | 2005069016 A1 | 7/2005 |
| WO | 2006096741 A1 | 9/2006 |
| WO | 2007098788 A1 | 9/2007 |
| WO | 2013131067 A1 | 9/2013 |
| WO | 2015059511 A1 | 4/2015 |

OTHER PUBLICATIONS

Zabit et al., "A self-mixing displacement sensor compensating parasitic vibration with a MEMs accelerometer," 2011 IEEE Sensors, Oct. 28-31, 2011, 4 pp.

Alegre et al., "Optomechanical zipper cavity lasers: theoretical analysis of tuning range and stability," OSA, Optics Express, vol. 18, No. 8, Apr. 12, 2010, 14 pp.

Chan et al., "Optical and mechanical design of a 'zipper' photonic crystal optomechanical cavity," Optical Society of America, Optics Express, vol. 17, No. 5, Mar. 2, 2009, pp. 3802-3817.

Cohen et al., "Optical coupling to nanoscale optomechanical cavities for near quantum-limited motion transduction," OSA, Optics Express, vol. 21, No. 9 May 1, 2013, 10 pp.

Cohen et al., "Phonon counting and intensity interferometry of a nanomechanical resonator," Macmillan Publishers Limited, Nature vol. 520, Apr. 23, 2015, 4 pp.

Datta et al., "Stress and magnetic field-dependent Young's modulus in single crystal iron-gallium alloys," Journal of Magnetism and Magnetic Materials, vol. 322, Feb. 4, 2010, pp. 2135-2144.

Davanco et al., "Slot-mode-coupled optomechanical crystals," OSA, Optics Express, vol. 20, No. 22, Oct. 22, 2012, 17 pp.

Eichenfield et al., "A picogram- and nanometre-scale photonic-crystal optomechanical cavity," Nature, vol. 459, Letters, May 2009, pp. 550-556.

Kim et al., "Real-Time Tuning of MEMS Gyro Dynamics," 2005 American Control Conference, FrA06.5, Jun. 8-10, 2005, 6 pp.

Krause et al., "A microchip optomechanical accelerometer," Nature Photonics, vol. 6, No. 11, Mar. 26, 2012, Retrieved from http://arxiv.org/abs/1203.5730, 16 pp.

Pitanti et al., "Strong Opto-Electro-Mechanical Coupling in a Silicon Photonic Crystal Cavity," OSA, Optics Express, vol. 23, No. 3, Feb. 3, 2015, 13 pp.

Siegel et al., "The Variation of Young's Modulus with Magnetization and Temperature in Nickel," Physical Review, vol. 49, May 1, 1936, 9 pp.

Trusov et al., "Silicon Accelerometer with Differential Frequency Modulation and Continuous Self-Calibration," 26th International Conference on Micro Electro Mechanical Systems (MEMS), Jan. 20-24, 2013, 4 pp.

Woolf et al., "Optomechanical and Photothermal Interactions in Suspended Photonic Crystal Membranes," OSA, Optics Express, vol. 21, No. 6, Mar. 25, 2013, 18 pp.

Yu et al., "A Vibration-Based MEMS Piezoelectric Energy Harvester and Power Conditioning Circuit," Sensors vol. 14, No. 2, Jan. 21, 2014, 19 pp.

U.S. Appl. No. 14/951,132, by Honeywell International Inc. (Inventors: Steven Tin et al.), filed Nov. 24, 2015.

U.S. Appl. No. 14/996,116, by Honeywell International Inc. (Inventors: Chad Fertig et al.), filed Jan. 14, 2016.

Notice of Allowance from U.S. Appl. No. 14/951,132, dated Oct. 20, 2017, 6 pp.

Office Action from U.S. Appl. No. 14/951,132 dated Jun. 30, 2017, 6 pp.

Intent to Grant dated Jan. 24, 2017, from counterpart European Application No. 16167986.5-1568, 31 pp.

Extended Search Report from counterpart European Application No. 16167986.5, dated Jul. 22, 2016, 5 pp.

Response to Office Action dated Jun. 30, 2017, from U.S. Appl. No. 14/951,132, filed Sep. 27, 2017, 10 pp.

* cited by examiner

ACTIVE, IN-SITU, CALIBRATION OF MEMS ACCELEROMETERS USING OPTICAL FORCES This Application claims the benefit of U.S. Provisional Patent Application No. 62/162,503 filed 15 May 2015 and entitled, "ACTIVE, IN-SITU, CALIBRATION OF MEMS ACCELEROMETERS USING OPTICAL FORCES," the entire content of which is incorporated herein by reference.

TECHNICAL FIELD

This disclosure relates to accelerometers.

BACKGROUND

In some examples, a microelectromechanical (MEMS) accelerometer measures acceleration by sensing the inertial forces applied by a proof mass on one or more flexible mechanical anchors. One technique of reading out the force, and therefore the input acceleration, is to measure the displacement of the mass relative to a frame. Another technique is to measure the stress induced in the restoring anchors as they counteract the inertial forces. The stress may, for example, be determined by measuring the change in the frequencies of the tuning fork vibrational modes of those anchors. In some MEMS accelerometers, these measurements are sometimes made by sensing changes in capacitance which communicate the changes in displacement or stress. These changes may also be sensed through changes to optical fields. The MEMS accelerometer is typically calibrated once, which occurs in the factory and before use. In the calibration, the output signal of the accelerometer device is measured when the device is subjected to a known acceleration, and the output is corrected to a standard output value.

SUMMARY

This disclosure relates to accelerometers and, more particularly, to devices and methods for calibrating microelectromechanical (MEMS) accelerometers.

In one example, a method of calibrating an accelerometer includes directing an output of a laser source onto a proof mass of an accelerometer to create a scattering force of a first magnitude applied to the proof mass; while applying the scattering force to the proof mass at the first magnitude, obtaining a first output from the accelerometer; directing the output of the laser source onto the proof mass of the accelerometer to create a scattering force of a second magnitude applied to the proof mass; while applying the scattering force to the proof mass at the second magnitude, obtaining a second output from the accelerometer; based on the first output and the second output, determining a scale factor for the accelerometer; obtaining a third output for the accelerometer; and based on the scale factor and the third output, determining an acceleration value.

In one example, an accelerometer device includes a proof mass; one or more anchor elements connected to the proof mass; a laser source configured to direct laser light onto the proof mass; a laser control module configured to: cause the laser source to apply a scattering force of a first magnitude to the proof mass; cause the laser source to apply a scattering force of a second magnitude to the proof mass; a sense module configured to: while the laser source applies the scattering force of the first magnitude to the proof mass, obtain a first output from the accelerometer, while the laser source applies the scattering force of the second magnitude to the proof mass, obtain a second output from the accelerometer; and determine a third output for the accelerometer; and a controller configured to: based on the first output and the second output, determine a scale factor for the accelerometer, and based on the scale factor and the third output, determine an acceleration value.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
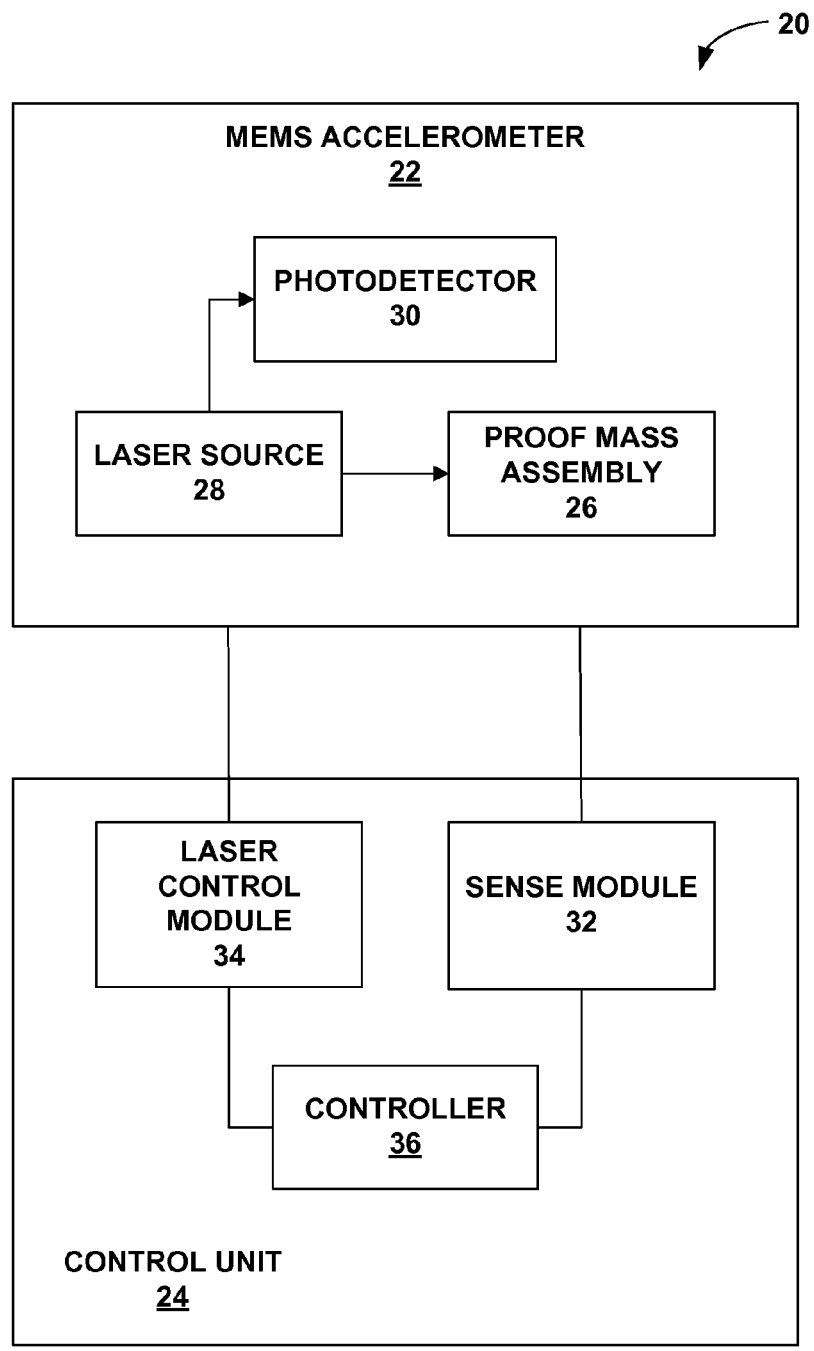
FIG. 1 is a conceptual diagram illustrating an example MEMS accelerometer system, in accordance with examples described herein.

This disclosure relates to accelerometers and, more particularly, to devices, systems, and methods for calibrating microelectromechanical (MEMS) accelerometers. The scale factor of an accelerometer is the factor (or more generally, the function) which establishes the size of the output signal (e.g., an electrical signal in units such as volts) for a given input acceleration experienced by the device. In a simple model of the accelerometer as a mass spring system, the scale factor is directly related to the elastic modulus of the one or more anchors that provide the proof mass restoring force. In some MEMS accelerometers, the scale factor of the accelerometer is determined prior to use of the accelerometer. Under relatively low inertial forces, such as human movement or even automobile movement, this scale factor may remain approximately constant such that the pre-use calibration of the accelerometer provides readings of acceleration values that are sufficiently accurate for most applications.

In some applications, however, the accelerometer may experience a shock when in use, and in some instances these shocks may be fairly significant. For example, an accelerometer device implemented in a commercial airplane may experience fairly minor shocks, while an accelerometer device implemented in a missile may experience a relatively more severe shock, and an accelerometer implemented in a projectile fired by a gun may experiences an even more severe shock. The shocks experienced during these shock events can alter the scale factor of the MEMS accelerometer and, thus, cause the accelerometer to lose accuracy when in use. More severe shocks can cause the accelerometer to output less accurate readings of acceleration values, and some applications where the shock is relatively severe (e.g., inertial guidance system for a gun-fired projectile) are also applications that require highly accurate acceleration readings to function properly. Additionally, aging of the accelerometer can alter the scale factor of an accelerometer due to the structural characteristics of various components of the accelerometer changing with age.

This disclosure describes devices, systems, and techniques that may enable an accelerometer system, such as a MEMS accelerometer, to self-calibrate while in use. For example, this disclosure introduces techniques that may enable an accelerometer device to determine a new scale factor while in use and generate readings of acceleration values based on the new scale factor.

According to the techniques of this disclosure, an accelerometer may determine a new scale factor while in use (e.g., after gun launch) by using lasers to apply forces to a proof mass (e.g., which may be referred to herein as laser-induced pushing forces). The accelerometer system may apply the laser-induced forces and determine accelerometer outputs while the laser-induced forces are applied. These laser-induced pushing forces can cause significant acceleration readings if the proof mass is relatively small. For example, a 10E-12 kilogram (kg) proof mass pushed by a 30 milliwatt (mW) laser at a 1.5 micron wavelength emission can experience the same force as caused by the acceleration of gravity, i.e., 1 g of acceleration. The laser-induced forces applied by a free space beam propagating from an emission point close to the proof mass (e.g. within a few microns) and striking the proof mass can be made independent of the size of gaps (e.g., gaps between the proof mass and the frame) and other mechanical parameters, making the calibration process itself robust to the shocks experienced by the accelerometer in the case that those shocks displace the proof mass a significant fraction of the gap.

By contrast, electrostatic forces applied to the proof mass by capacitive coupling across the gap depend on the dimensions of the gap, which may change after the accelerometer experiences a shock, making electrostatic forces potentially less suitable for an in-situ calibration scheme in some cases. Also, in contrast to applying a force with capacitive electrodes, the application of laser forces may not cause a build up of up electrical charges on MEMS elements. The build up of such electrical charges may have deleterious effects on accelerometer outputs due to the unknown and uncontrolled electrostatic forces those charges exert on the proof mass.

According to the techniques of this disclosure, a laser beam from a laser source (e.g., a co-packaged photonics circuit) may be directed through a free space gap between the laser source and the MEMS accelerometer proof mass to impinge on the proof mass along the sense axis of the MEMS accelerometer. An amplitude modulator may amplitude modulate the laser at a frequency (f dither) to adjust the intensity of the laser. For example, the amplitude modulator may change a drive current of the laser between values either discretely or continuously. Additionally or alternatively, the control signals to external amplitude modulation devices (such as electrically actuated variable attenuators, or waveguide- or fiber-based interferometric modulators) may also be changed to adjust the intensity of the laser source. By changing either the laser drive current or the control signals to the external attenuators or shutters, the laser can induce forces of different magnitudes on the proof mass In some examples, a photodetector, such as an integrated photodiode, may monitor a known, stable fraction of the photon flux (such as may be sampled by an evanescently coupled waveguide or a partial reflector, for example). Under these conditions, the accelerometer may provide an output (indicative of acceleration) that corresponds to the applied force that is proportional to the integrated photodiode signal. It may not be necessary to know the exact magnitude of the force. In some examples, in order to assure that there is no direct current (DC) component of the force, should no DC component be desired, the laser scattering force may, for example, be applied to both sides of the proof mass, with the excitations 180 degrees out of phase and of equal amplitude. In some implementations, the condition of equal amplitude may be easier to establish than an absolute magnitude.

The accelerometer output at the Fourier frequency f_dither has a value related to the scale factor times the applied and external accelerations of frequency f_dither. The scale factor can be extracted from these measurements to an accuracy commensurate with the level to which the influence of unknown external accelerations can be rejected. Thus, f_dither may be chosen to be a frequency at which the external accelerations are likely to be white-noise-like, so that lock-in detection of the periodically applied laser force yields an acceptable level of accuracy on the inferred scale factor. Lock-in detection may, for example, include demodulation at the frequency f_dither, narrowband filtering, and final amplification of the accelerometer output signal. It may not be necessary to know the DC level of the unknown acceleration if the detection of the stimulated response is sufficiently narrow around a sufficiently high f_dither.

The devices, systems, and techniques of this disclosure make use of the scattering force of laser light off of a material body. When a material body back reflects a photon of incident laser light, the momentum of the object changes by $2*h\_bar*k$, in where $k=2pi/lambda$ is the wavevector of the laser light and where h_bar corresponds to Planck's constant (h) divided by 2pi and where lamda refers to the wavelength of the light emitted by the laser. This assumes the plane-wave limit for the photon momentum. The momentum transferred by a photon in the Gaussian mode of a laser beam can be slightly different, but this difference can be compensated for in the practice of the techniques described herein. The momentum transferred by a photon absorbed by the mass is $h\_bar*k$. Thus, if the photon flux (photons/sec) incident on the body is known, if the laser wavelength and spatial mode are characterized and stable, and if the reflecting/absorbing constants of the body are stable, then the momentum transferred to the body per second (i.e., the laser-induced force) can be known. Such circumstances may be sufficient for performing the calibration procedure described herein, as long as the properties of the laser source do not change from immediately before to immediately after a shock event of a particular accelerometer.

FIG. 1 is a block diagram of an example MEMS accelerometer system 20 configured in accordance with examples of this disclosure. MEMS accelerometer system 20 may be configured to self-calibrate in use by updating the scale factor by which measured outputs are mapped to acceleration values. The MEMS accelerometer system 20 includes a MEMS accelerometer 22 and a control unit 24. The MEMS accelerometer 22 includes proof mass assembly 26, laser source 28, and photodetector 30. The control unit 24 includes a sense module 32 and a laser control module 34, both in signal communication with the MEMS accelerometer 22. The control unit 24 also includes a controller 36 in signal communication with the sense module 32 and the laser control module 34. In the example of FIG. 1, sense module 32, laser control module 34, and controller 36 have been shown separately for purposes of simplifying explanation, but it should be understood that sense module 32, laser control module 34, and controller 36 may in fact be highly integrated.

Control unit 24 and the various components of control unit 24 may be implemented as any suitable arrangement of hardware, software, firmware, or any combination thereof, to perform the techniques attributed to control unit 24. For example, control unit 24 may include any of one or more microprocessors, digital signal processors (DSPs), application specific integrated circuits (ASICs), field programmable gate arrays (FPGAs), or any other equivalent integrated or discrete logic circuitry, as well as any combinations of such components. Control unit 24 may additionally include memory and other components.

Figure 2:
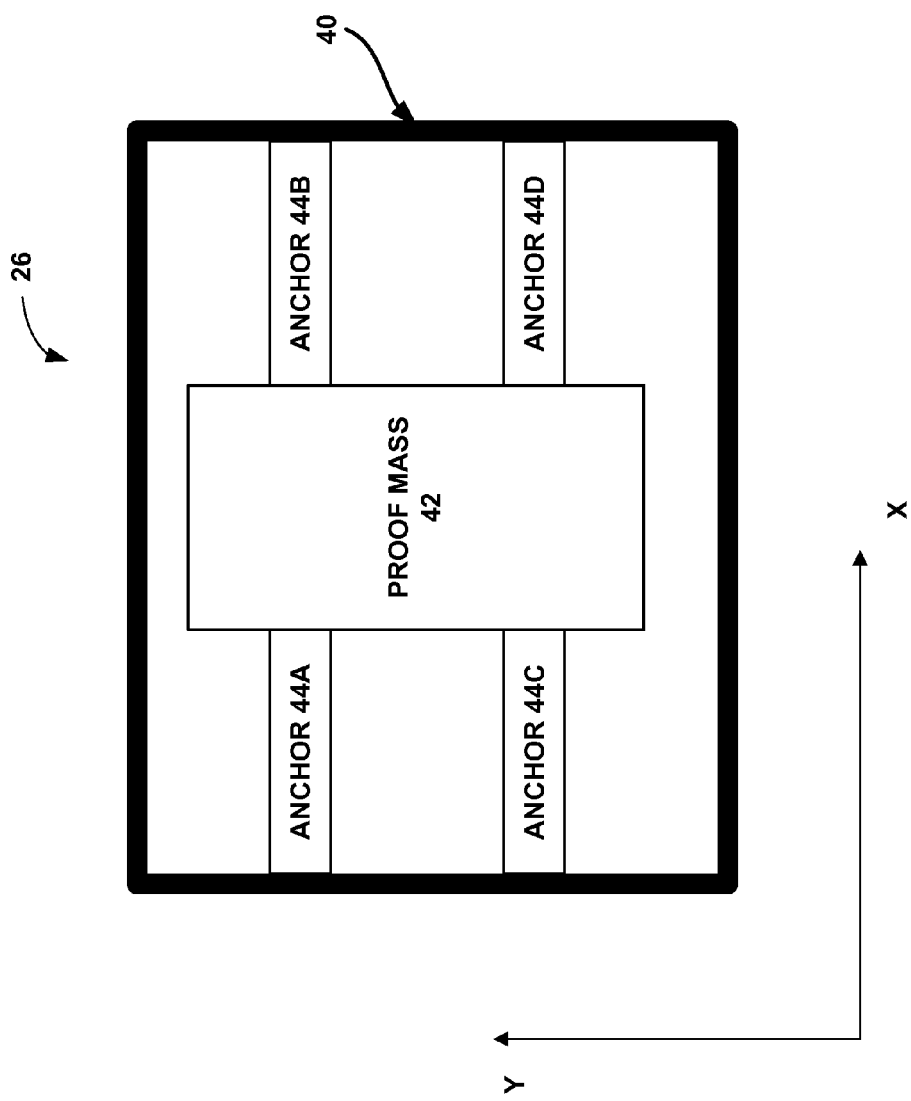
FIG. 2 is a conceptual diagram illustrating an example proof mass assembly, in accordance with examples described herein.

FIG. 2 is a conceptual diagram of an example proof mass assembly 26 of FIG. 1, shown, e.g., in an elevational view. Proof mass assembly 26 includes frame 40, proof mass 42, and anchors 44A-44D (collectively, "anchors 44"). Anchors 44 may also be referred to as anchor elements, flexures, flexure elements, or other such terms. Frame 40 may also be referred to as a base or other such term. Anchors 44 mechanically connect proof mass 42 to frame 40. Proof mass assembly 26 may be configured to operate either in-plane or out-of-plane. In an in-plane configuration, anchors 44 are relatively rigid in the z-axis direction but are configured to allow proof mass 42 to move in the x-axis and y-axis directions relative to frame 40 in the presence of inertial forces. Thus, in an in-plane configuration, both the x-axis and the y-axis are sensitive axes. Orthogonal x-y axes are shown in FIG. 2 for ease of description only. By contrast, in an out-of-plane configuration, anchors 44 are relatively rigid in the x-axis and y-axis directions but are configured to allow proof mass 42 to move in the z-axis direction relative to frame 40 in the presence of inertial forces. Thus, in an out-of-plane configuration, the z-axis is the sensitive axis.

Regardless of whether proof mass assembly 26 is configured to move in an in-plane or out-of-plane configuration, sense module 32 of FIG. 1 may be configured to measure an acceleration (also referred to herein as an "acceleration value") experienced by proof mass assembly 26 by detecting the displacement of proof mass 42 under inertial forces. Sense module 32 may, for example, detect the displacement of proof mass 42 using a capacitive pick-off system (not shown in FIG. 1 or FIG. 2). In such an example, a capacitor plate may be deposited on a surface of proof mass 42, and a similar capacitor plate may be deposited elsewhere in proof mass assembly 26. Under inertial forces, the distances between the capacitive plates, and thus the capacitance, changes. By measuring this change in capacitance, controller 36 may calculate an acceleration value.

Additionally, sense module 32 may be configured to detect the displacement of proof mass 42 optically by using a laser interaction with proof mass 42, sensitive to the displacement of the proof mass. Additionally or alternatively, sense module 32 may be configured to measure acceleration by detecting the strain in the anchors 44 due to inertial forces, for example, by detecting the change in the resonant frequency of the tuning fork vibrational modes of the anchors 44. It should be understood that capacitive pickoff of displacement or strain, or optical pick off of displacement or strain, are merely two examples of how acceleration of proof mass 42 may be detected, and that the techniques of this disclosure are not limited to any particular types of acceleration detection techniques.

Figure 3:
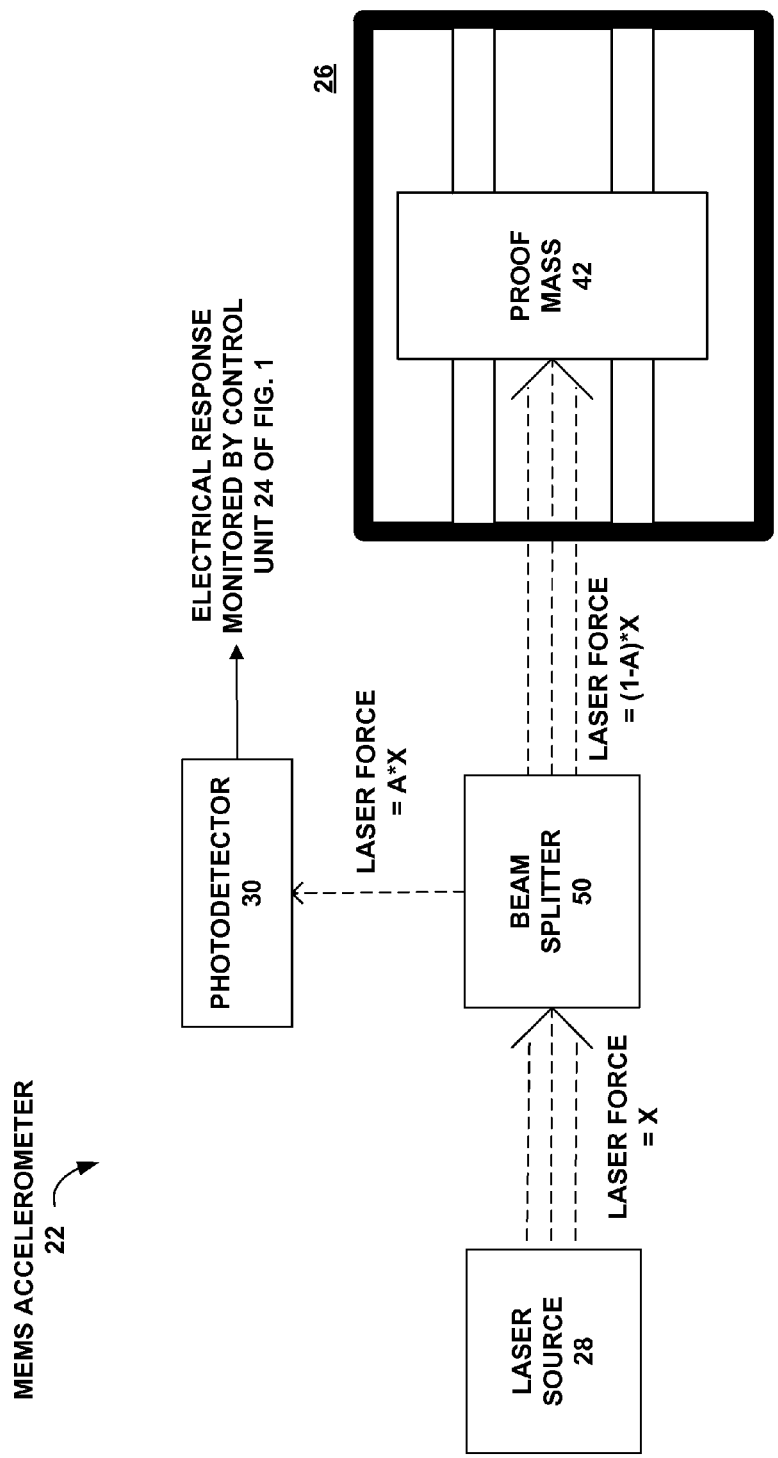
FIG. 3 is a conceptual diagram illustrating an example MEMS accelerometer portion of a MEMS accelerometer system, in accordance with examples described herein.

FIG. 3 is a block diagram showing a more detailed view of MEMS accelerometer 22 in accordance with examples of this disclosure. In the example of FIG. 3, laser source 28 emits (e.g., outputs, transmits, or the like) a laser. The laser may, for example, have an optical power between 1 mW and 30 mW, although the examples of this disclosure are not limited to any particular power. Laser source 28 may, for example, be a photonic integrated circuit adjacent to proof mass 42. MEMS accelerometer 22 includes beam guiding and beam splitting optics, which may for example be integrated photonics waveguides in the substrate of frame 40 (FIG. 2) or on a second substrate bonded or affixed to frame 40. In some examples, laser source 28 may be in a second layer, and the laser light produced by laser source 28 may be coupled into the MEMS substrate via evanescent waveguide coupling. Beam splitter 50 directs a percentage (determined by factor A) of the laser produced by laser source 28 to photodetector 30 and directs the remainder (1−A) of the laser at proof mass 42.

Photodetector 30 may, for example, include a photodiode, with the electrical response of the photodiode being proportional to the force of the laser produced by laser source 28. In some examples, the value of the proportionality constant (A) may, for example, be approximately 0.01, such that beam splitter 50 directs 99% of the laser at proof mass 42 and the remaining 1% at photodetector 30. However, the techniques of this disclosure are not limited to any particular value of A, and moreover, an exact value of does not necessarily need to be known as long as the value stays the same or close to the same both before and/or after a shock event.

Beam splitter 50 may, for example, carry a portion of the laser produced by laser source 28 towards proof mass 42 and launch that portion into a free space gap, shining on an edge or a surface of proof mass 42. The scattering force of the laser pushes on proof mass 42. This scattering force, which may also be referred to as a laser-induced force or a laser-induced pushing force, is proportional to the photodetector voltage detected at photodetector 30.

According to examples of this disclosure, MEMS accelerometer system 20 may be configured to perform in-situ scale factor correction by performing a calibration process while in use (e.g., while experiencing and measuring inertial forces along the sense axis). Under the control of laser control module 34, laser source 28 applies a laser-induced force of a first magnitude to proof mass 42. While laser source 28 applies the laser-induced force of a first magnitude to proof mass 42, sense module 32 obtains a first output from MEMS accelerometer 22. Under the control of laser control module 34, laser source 28 applies the laser-induced force of a second magnitude to proof mass 42. While laser source 28 applies the laser-induced force of a second magnitude to proof mass 42, sense module 32 obtains a second output from MEMS accelerometer 22. The first output and second outputs may, for example, be voltage values or current values determined by a force-rebalancing system.

In some examples, under the control of laser control module 34, laser source 28 may for example amplitude modulate (at a modulation frequency f mod) the intensity of the laser light directed onto proof mass 42 to achieve the laser-induced forces of the first and second magnitudes. Although FIG. 1 does not explicitly show an amplitude modulator, such functionality may be integrated into laser source 28 or separate from but configured to operate in conjunction with laser source 28. Laser control module 34 may monitor an electrical response of photodetector 30 as part of achieving the laser-induced forces of the first and second magnitudes. Based on such monitoring, laser control module 34 may make adjustments to laser source 28 or to the modulation of the laser produced by laser source 28 in order to achieve the first and second magnitudes.

Based on the first output and the second output, or an average of many such readings during a time period, controller 36 determines a scale factor (e.g. a new or updated scale factor) for MEMS accelerometer 22. Controller 36 may maintain a calibration table and update the calibration table based on the newly determined scale factor. After the new scale factor is determined, sense module 32 can determine a third output for MEMS accelerometer 22, and based on the scale factor and the third output, controller 36 can determine an acceleration value. Thus, the acceleration determined based on the third output is determined using the new scale factor after calibration.

Controller 36 may obtain and store pre-shock event data to give a "reference" value to calibrate against. In effect, control unit 24 uses the acceleration to calibrate the laser power in the pre-shock measurement, and then uses the laser power to measure the MEMS response in the post-shock measurement. In this way, control unit 24 can recover the original scale factor after a shock event, or more generally, to compare the scale factors at any two points in time. The accuracy of the comparison is related to the stability of the measurement of the laser force, which can be very stable for short time intervals (such as before/after a shock event). The calibration procedure compares the accelerometer response to substantially identical (e.g., identical or near identical) laser-force stimuli at two different times (such as before and after a shock), and does not require control unit 24 to know the absolute magnitude of the laser-induced forces on proof mass 42 at either time.

As will be explained in greater detail below, additionally or alternatively, laser source 28 may direct a laser-induced force onto opposite sides of proof mass 42. The relative phase of the laser-induced forces may be applied to each side of proof mass 42 and may be adjusted to achieve substantially symmetric (e.g., symmetric or nearly symmetric) pushing on each side of proof mass 42. This may be achieved by the use of additional splitting waveguides and photodetectors, as will be described below with reference to FIG. 4.

Figure 4:
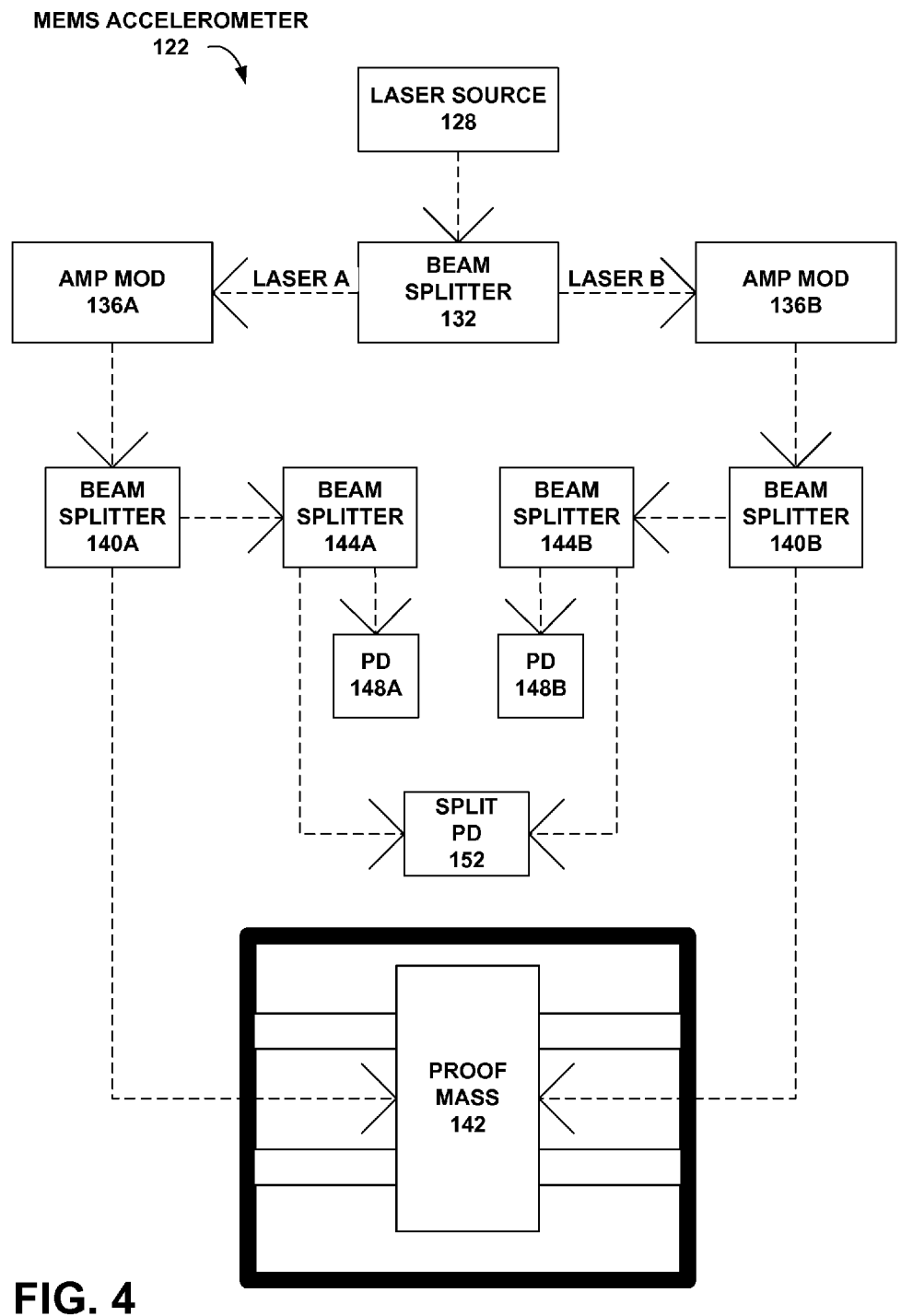
FIG. 4 is a conceptual diagram illustrating an example MEMS accelerometer portion of a MEMS accelerometer system, in accordance with examples described herein.

FIG. 4 is a block diagram showing a detailed view of MEMS accelerometer 122 in accordance with the techniques of this disclosure. In some examples, MEMS accelerometer 122 may be incorporated into MEMS accelerometer system 20 of FIG. 1 in place of MEMS accelerometer 22. MEMS accelerometer 122 includes laser source 128, beam splitter 132, amplitude modulators 136A and 136B, beam splitters 140A and 140B, proof mass 142, beam splitters 144A and 144B, photodetector 148A and 148D, and split photodetector 152.

In the example of FIG. 4, laser source 128 emits (e.g., outputs, transmits, or the like) a laser at a certain optical power. Laser source 128 may, for example, be a photonic integrated circuit adjacent to proof mass 142. MEMS accelerometer 122 includes beam guiding and beamsplitting optics, which may for example be integrated photonics waveguides in the substrate of a frame of accelerometer 12 or on a second substrate bonded or affixed to the frame. In some examples, laser source 128 may be in a second layer, and the laser light produced by laser source 128 may be coupled into the MEMS substrate via evanescent waveguide coupling. Beam splitter 132 directs a first portion (labeled LASER A in FIG. 4) of the laser produced by laser source 128 to first amplitude modulator 136A and directs a second portion (labeled LASER B in FIG. 4) of the laser produced by laser source 128 to second amplitude modulator 136B. Amplitude modulator 136A amplitude modulates laser A at a frequency (f_dither) to adjust the intensity of laser A. Amplitude modulator 136B similarly amplitude modulates laser B at a frequency (f_dither) to adjust the intensity of the laser B.

Amplitude modulator 136A sends the amplitude modulated laser A to beam splitter 140A, and beam splitter 140A directs a first portion of the amplitude modulated laser A to a first side of proof mass 142. Amplitude modulator 136B sends the amplitude modulated laser B to beam splitter 140B, and beam splitter 140B directs a first portion of the amplitude modulated laser B to a second side of proof mass 142. By applying force to both sides, proof mass 142 experiences zero net force on average over time, which enables a sense module 32 (FIG. 1) to read out data from MEMS accelerometer 22 while calibration is being performed.

Beam splitter 140A directs the remaining portion of amplitude modulated laser A to beam splitter 144A, and beam splitter 140B directs the remaining portion of amplitude modulated laser B to beam splitter 144B. In some implementations, beam splitters 140A and 140B will direct the majority (e.g. greater than 95%) of the amplitude modulated laser to proof mass 142 and will direct the remaining portion of the amplitude modulated laser to beam splitters 144A and 144B, respectively. Beam splitters 144A and 144B direct the remaining portions of lasers A and B to photodetectors 148A and 148B respectively, as well as to split photodetector 152.

Photodetector 148A may, for example, include a photodiode, with the electrical response of the photodiode being proportional to the force of the laser provided by amplitude modulator 136A. Photodetector 148B may similarly include a photodiode, with the electrical response of the photodiode being proportional to the force of the laser provided by amplitude modulator 136B. In some cases, due to normal variations in the physical characteristics of photodiodes, photodetectors 148A and 148B may not have exact same response. Therefore, split photodetector 152 may be used to calibrate photodetectors 148A and 148B. Split photodetector 152 may essentially be two separate photodiodes manufactured into a single component. Due to being manufactured into a single component, the responses may be more similar to one another than photodetectors 148A, and thus, the difference detected between the two lasers measured at split photodetector 152 may be used to calibrate the system. As part of such calibration, the modulation of one or both of amplitude modulator 136A and 136B may be adjusted based on the response detected at split photodetector 152.

Figure 5:
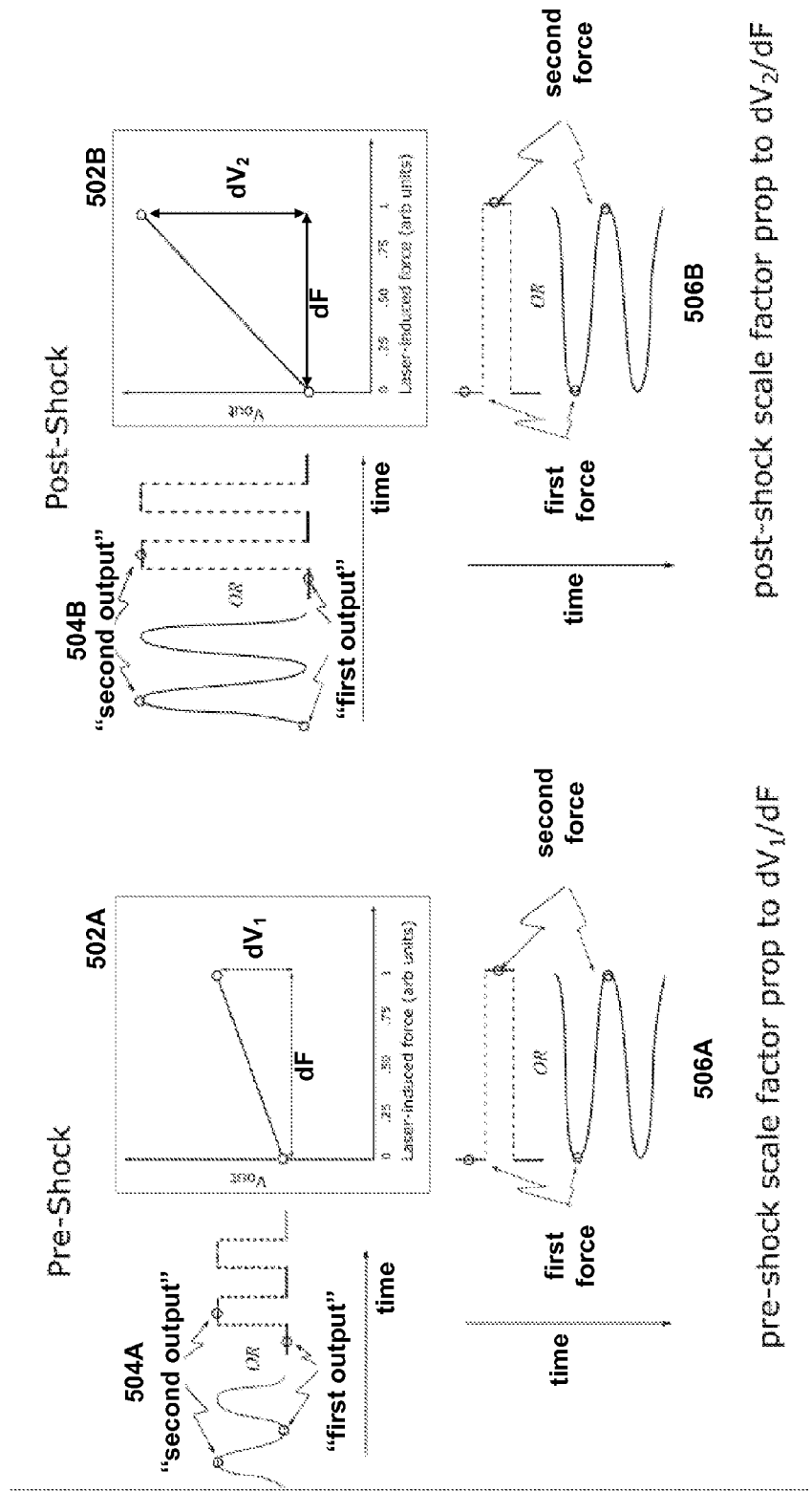
FIGS. 5A and 5B show three examples of a linear extrapolation for determining a bias value of a MEMS accelerometer system in accordance with the examples of this disclosure.

FIGS. 5A and 5B show examples of how controller 36 may calculate the scale factor of MEMS accelerometer system 20 before (FIG. 5A) and after (FIG. 5B) a shock event. The techniques described with respect to FIGS. 5A and 5B are applicable to both MEMS accelerometer 22 of FIGS. 1 and 3, as well as to MEMS accelerometer 122 of FIG. 4. It should be appreciated that FIGS. 5A and 5B are intended to provide graphical representations of how certain calculations are made and may not correspond directly to steps or operations performed by control unit 24.

Graph 502A of FIG. 5A and graph 502B of FIG. 5B show an output of an accelerometer as a function of the force of a laser applied to a proof mass of that accelerometer. The output signal Vout of the accelerometer has contributions from several sources, as represented in the following equation:

$$V_{out} = a_{input} \frac{dx}{da} \frac{dV}{dx} + x_{bias} \frac{dV}{dx} + V_0 + \frac{F_{laser}}{M} \frac{dx}{da} \frac{dV}{dx} \quad (1)$$

where the first term $$a_{input} \frac{dx}{da} \frac{dV}{dx}$$

is the desired output, proportional to the input acceleration, and the next two terms $$x_{bias} \frac{dV}{dx}$$

and $V_0$ are bias terms, which do not depend on the input acceleration. The final term $$\frac{F_{laser}}{M} \frac{dx}{da} \frac{dV}{dx}$$

represents the portion of the output related to the force of the calibration laser (e.g., laser source 28 or 128). The x-axis in graphs 502A and 502B shows the laser induced pushing force in arbitrary units, i.e., where "0" is no force, and "1.0" is a baseline force, such as 9.8 pN or some other value.

Graphs 504A and 504B show plots of outputs of MEMS accelerometer system 20 over time before and after a shock event, respectively. As shown in graph 504A, before a shock event, sense module 32 may read at least two outputs (labeled as first output and second output in FIG. 5A) of MEMS accelerometer system 20 for at least two values of the pushing laser power. The two values of the pushing force are labeled in graph 506A as first force and second force. Referring back to graph 502A, controller 36 may calculate the slope of the line connecting the first output value and the second output value corresponds to a first measurement of the scale factor $$\frac{dx}{da} \frac{dV_1}{dx} = \frac{dV}{da},$$

regardless of the total external acceleration on the MEMS accelerometer 22 (up to the point where the accelerometer exhibits nonlinearity). The slope of the line, $$\frac{dV}{dF},$$

is proportional to the scale factor. The scale factor generally corresponds to the change in output voltage per change in input acceleration.

As shown in FIG. 5B, after a shock event, sense module 32 may again read at least two outputs (labeled as first output and second output in graph 504B) of MEMS accelerometer 22, for the same at least two values of the pushing laser power. Controller 36 may calculate the slope of the line connecting the first output value and the second output value corresponds to a second measurement of the scale factor $$\frac{dV_2}{dx}.$$

The total acceleration on the MEMS accelerometer may be different before and after the shock event (as depicted in FIGS. 5A and 5B). In some examples, the two samples may be achieved not by stepping the force between two discrete values, but by a continuous (e.g. sinusoidal) modulation of the applied laser power. The samples may be extracted from the continuous data stream, by measuring the max and min, or other values of the response. In the above description, dx corresponds to a small displacement of the proof mass. In FIGS. 5A and 5B, dx has been converted into the corresponding output voltage.

Figure 6:
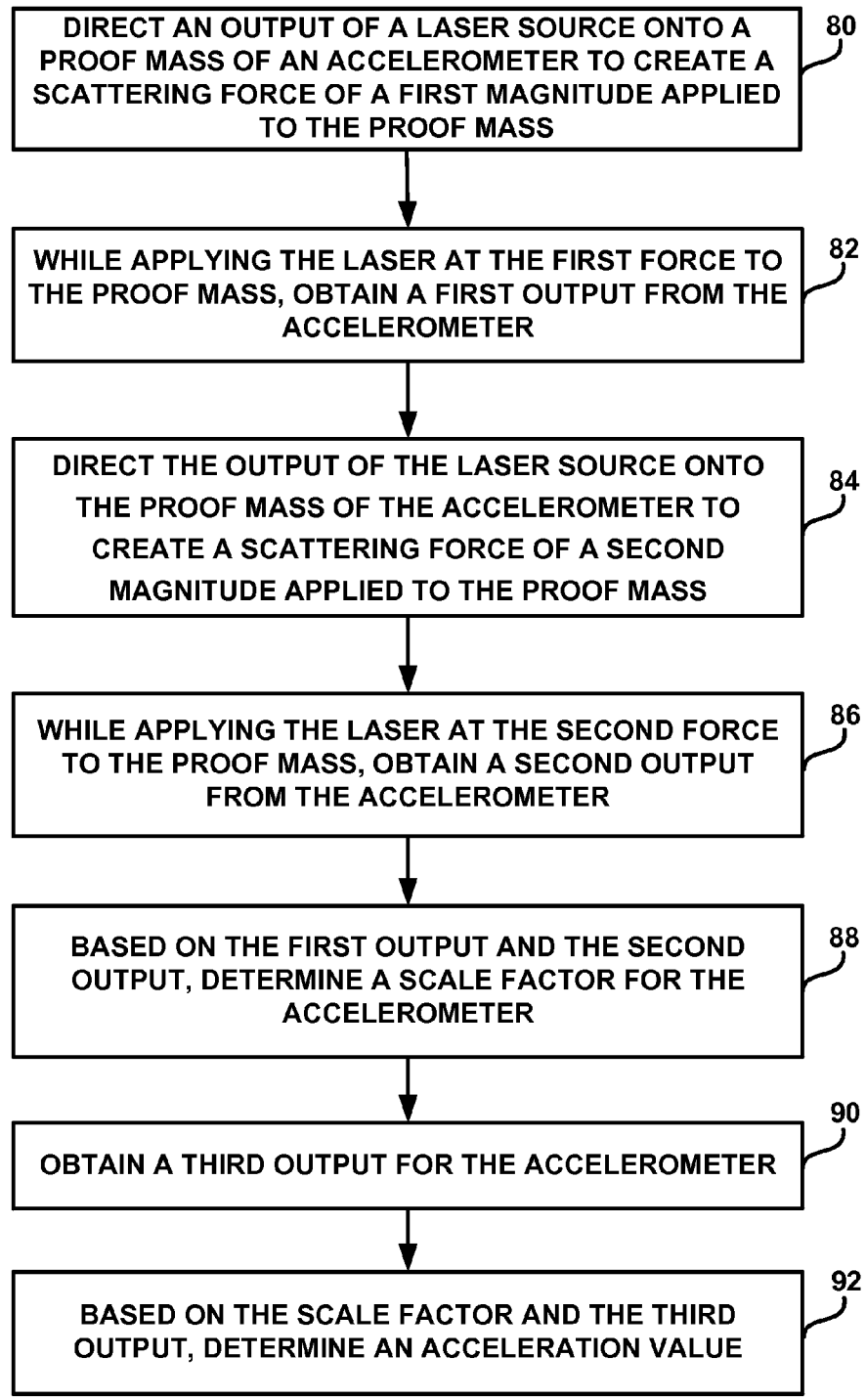
FIG. 6 is a flowchart showing an example method of calibrating a MEMS accelerometer using optical forces according to examples of this disclosure.

FIG. 6 is a flowchart illustrating an example method of calibrating an accelerometer according to some examples of this disclosure. The techniques of FIG. 6 will be described with respect to MEMS accelerometer system 20, but it should be understood that the techniques of FIG. 6 may also be performed by other types of MEMS accelerometer systems.

In the example of FIG. 6, laser source 28, under the control of laser control module 34, directs an output of laser source 28 onto proof mass 42 of MEMS accelerometer 22 to create a scattering force of a first magnitude applied to proof mass 42 (80). While applying the laser at the first force to proof mass 42, sense module 32 obtains a first output from MEMS accelerometer 22 (82). Laser source 28, under the control of laser control module 34, directs the output of laser source 28 onto proof mass 42 of MEMS accelerometer 22 to create a scattering force of a second magnitude applied to proof mass 42 (84). While applying the laser at the second force to proof mass 42, sense module 32 obtains a second output from MEMS accelerometer 22 (86). Based on the first output and the second output, controller 36 determines a scale factor for MEMS accelerometer system 20 (88). Sense module 32 obtains a third output from MEMS accelerometer 22 (90) and, based on the scale factor and the third output, controller 36 determines an acceleration value (92). In some examples, laser source 28, under the control of laser control module 34, may step the applied laser-induced pushing force between two discrete values. In other examples, laser source 28 continuously varies the applied laser-induced pushing force between a maximum and minimum value.

In one or more examples, the functions described herein may be implemented in an accelerometer system as hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted using any wired or wireless technologies, then such technologies are include in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses, including devices that incorporate integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, as described above, various units may be combined in a common hardware unit or provided by a collection of interoperative hardware units, including one or more processors as described above, in conjunction with suitable software and/or firmware.

Various examples have been described. These and other examples are within the scope of the following claims.

What is claimed is:

1. A method of calibrating an accelerometer, the method comprising:
    directing an output of a laser source onto a proof mass of an accelerometer to create a scattering force of a first magnitude applied to the proof mass;
    while applying the scattering force to the proof mass at the first magnitude, obtaining a first output from the accelerometer;
    directing the output of the laser source onto the proof mass of the accelerometer to create a scattering force of a second magnitude applied to the proof mass;
    while applying the scattering force to the proof mass at the second magnitude, obtaining a second output from the accelerometer;
    based on the first output and the second output, determining a scale factor for the accelerometer;
    obtaining a third output for the accelerometer; and
    based on the scale factor and the third output, determining an acceleration value.

2. The method of claim 1, wherein the first output and second output comprise voltage values.

3. The method of claim 1, further comprising:
    amplitude modulating a frequency of the laser to achieve the scattering force of the first magnitude.

4. The method of claim 1, further comprising:
    amplitude modulating the frequency of the laser to achieve the scattering force of the second magnitude.

5. The method of claim 1, further comprising modulating the frequency of the laser to continuously vary a scattering force applied by the laser between a maximum amplitude and a minimum amplitude, wherein determining the third output for the accelerometer comprises determining the third output while modulating the frequency of the laser.

6. The method of claim 1, wherein the first magnitude and the second magnitude are determined based on monitoring an electrical response of a photodetector.

7. The method of claim 1, further comprising:
    maintaining a calibration table;
    updating the calibration table based on the determined scale factor.

8. An accelerometer device comprising:
    a proof mass;
    one or more anchor elements connected to the proof mass;
    a laser source configured to direct laser light onto the proof mass;
    a laser control module configured to:
        cause the laser source to apply a scattering force of a first magnitude to the proof mass;
        cause the laser source to apply a scattering force of a second magnitude to the proof mass;
    a sense module configured to:
        while the laser source applies the scattering force of the first magnitude to the proof mass, obtain a first output from the accelerometer,
        while the laser source applies the scattering force of the second magnitude to the proof mass, obtain a second output from the accelerometer; and
        determine a third output for the accelerometer; and
    a controller configured to:
        based on the first output and the second output, determine a scale factor for the accelerometer, and
        based on the scale factor and the third output, determine an acceleration value.

9. The accelerometer device of claim 8, wherein the first output and second output comprise voltage values.

10. The accelerometer device of claim 8, further comprising an amplitude modulator configured to amplitude modulate the laser to achieve the scattering force of the first magnitude.

11. The accelerometer device of claim 10, wherein the amplitude modulator is further configured to perform sinusoidal modulation of the laser.

12. The accelerometer device of claim 10, wherein the amplitude modulator is configured to amplitude modulate the laser to continuously vary a scattering force of the laser between a maximum magnitude and a minimum magnitude, and wherein the sense module is further configured to determine the third output for the accelerometer while the laser source modulates the frequency of the laser.

13. The accelerometer device of claim 10, wherein the amplitude modulator is further configured to amplitude modulate the laser to achieve the second magnitude.

14. The accelerometer device of claim 8, further comprising a photodetector, wherein the laser control module is configure to determine the first magnitude and the second magnitude based on monitoring an electrical response of the photodetector.

15. The accelerometer device of claim 8, wherein the controller is further configured to:

maintain a calibration table, and
update the calibration table based on the determined scale factor.

16. The accelerometer device of claim 8, further comprising:
    beam splitting optics configured to direct a first portion of laser light produced by the laser source onto a first side of the proof mass.

17. The accelerometer device of claim 16, wherein the beam splitting optics are further configured to direct a second portion of the laser light produced by the laser source onto a second side of the proof mass, wherein the first side is different than the second side.

18. The accelerometer device of claim 17, further comprising:
    a first amplitude modulator configured to amplitude modulate the first portion of laser light; and
    a second amplitude modulator configured to amplitude modulate the second portion of the laser light.

19. The accelerometer device of claim 18, further comprising:
    a first photodetector, wherein the laser control module is configure to determine, based on monitoring an electrical response of the first photodetector, a magnitude of a force of the first portion of laser light produced by the laser source directed onto the first side of the proof mass; and
    a second photodetector, wherein the laser control module is configure to determine, based on monitoring an electrical response of the second photodetector, a magnitude of a force of the second portion of laser light produced by the laser source directed onto the second side of the proof mass.

20. The accelerometer device of claim 18, further comprising:
    a split photodetector, wherein the controller is configured to adjust the modulation of at least one of the first and second modulator based on an electrical response of the split photodetector.

* * * * *